United States Patent
West et al.

(10) Patent No.: US 11,667,342 B2
(45) Date of Patent: Jun. 6, 2023

(54) ACTIVE TRACK-CHAIN SAG MANAGEMENT SYSTEMS FOR CRAWLER VEHICLES

(71) Applicant: Deere & Company, Moline, IL (US)

(72) Inventors: Sean P. West, Dubuque, IA (US); Reginald M. Bindl, Bettendorf, IA (US); Brian J. Althoff, Dubuque, IA (US); Lawrence W. Bergquist, Dubuque, IA (US); Russell R. Reeg, Dubuque, IA (US)

(73) Assignee: DEERE & COMPANY, Moline, IL (US)

(*) Notice: Subject to any disclaimer, the term of this patent is extended or adjusted under 35 U.S.C. 154(b) by 806 days.

(21) Appl. No.: 16/592,136

(22) Filed: Oct. 3, 2019

(65) Prior Publication Data
US 2021/0101653 A1 Apr. 8, 2021

(51) Int. Cl.
*B62D 55/30* (2006.01)
*G01L 5/10* (2020.01)
*B62D 55/125* (2006.01)

(52) U.S. Cl.
CPC .......... *B62D 55/30* (2013.01); *B62D 55/125* (2013.01); *G01L 5/10* (2013.01)

(58) Field of Classification Search
CPC .................................................. B62D 55/30
See application file for complete search history.

(56) References Cited

U.S. PATENT DOCUMENTS

| 3,549,213 A | 12/1970 | Smith et al. |
| 3,826,543 A | 7/1974 | Muller |
| 3,901,563 A | 8/1975 | Day |
| 3,910,649 A | 10/1975 | Roskaft |
| 3,972,569 A | 8/1976 | Bricknell |
| 4,149,757 A | 4/1979 | Meisel, Jr. |

(Continued)

FOREIGN PATENT DOCUMENTS

| CN | 200967505 Y | 10/2007 |
| CN | 103057616 A | 4/2013 |

(Continued)

OTHER PUBLICATIONS

German Search Report issued in counterpart application No. 102020210157.4 dated May 12, 2021 (14 pages).

(Continued)

*Primary Examiner* — Kevin Hurley
(74) *Attorney, Agent, or Firm* — Klintworth & Rozenblat IP LLP (57) ABSTRACT

An active track-chain sag management system for usage in conjunction with crawler vehicles having tracked undercarriages includes a movable track-engaging member positioned for physical engagement into a track-chain of the tracked undercarriage, an electric drive assembly controllable to adjust a track-tensioning position of the movable track-engaging member relative to the track-chain, and a controller operatively coupled to the electric drive assembly. The controller is configured to command the electric drive assembly to repeatedly adjust the track-chain sag of the track-chain by varying the track-tensioning position of the movable track-engaging member during operation of the tracked undercarriage.

19 Claims, 5 Drawing Sheets

(56) References Cited

U.S. PATENT DOCUMENTS

| | | | |
|---|---|---|---|
| 4,227,748 A | 10/1980 | Meisel, Jr. | |
| 4,545,624 A | 10/1985 | Van Ooyen | |
| 5,165,765 A | 11/1992 | Baylor | |
| 5,316,381 A | 5/1994 | Isaacson et al. | |
| 5,984,436 A * | 11/1999 | Hall | B62D 55/30 305/144 |
| 6,024,183 A * | 2/2000 | Dietz | B62D 55/30 180/9.1 |
| 6,106,082 A | 8/2000 | Gustin | |
| 6,224,172 B1 | 5/2001 | Goodwin | |
| 6,249,994 B1 | 6/2001 | Oertley | |
| 6,276,768 B1 | 8/2001 | Miller | |
| 6,280,010 B1 | 8/2001 | Oertley | |
| 6,305,762 B1 | 10/2001 | Oertley | |
| 6,305,763 B1 | 10/2001 | Oertley | |
| 6,354,678 B1 | 3/2002 | Oertley | |
| 6,431,008 B1 | 8/2002 | Oertley et al. | |
| 6,431,665 B1 | 8/2002 | Banerjee et al. | |
| 7,172,257 B2 * | 2/2007 | Tamaru | B62D 55/30 305/145 |
| 7,866,420 B1 | 1/2011 | Claas et al. | |
| 7,914,087 B2 * | 3/2011 | Alfthan | B62D 55/305 305/145 |
| 10,099,735 B2 * | 10/2018 | Vik | B62D 55/30 |
| 2001/0038245 A1 | 11/2001 | Toms et al. | |
| 2002/0156574 A1 | 10/2002 | Fortin | |
| 2002/0171289 A1 | 11/2002 | Boyum | |
| 2003/0034191 A1 | 2/2003 | Karpik | |
| 2003/0117017 A1 | 6/2003 | Hoff | |
| 2003/0122422 A1 | 7/2003 | Hoff et al. | |
| 2004/0026994 A1 | 2/2004 | Vandendriessche et al. | |
| 2004/0119336 A1 | 6/2004 | Lussier | |
| 2005/0029866 A1 | 2/2005 | Tamaru et al. | |
| 2005/0035654 A1 * | 2/2005 | Tamaru | B62D 55/30 305/145 |
| 2005/0231035 A1 * | 10/2005 | Vertoni | B62D 55/14 305/143 |
| 2006/0158034 A1 | 7/2006 | Hollister et al. | |
| 2009/0072617 A1 | 3/2009 | Alfthan | |
| 2009/0273233 A1 | 11/2009 | Shelbourn et al. | |
| 2010/0237691 A1 | 9/2010 | Frank et al. | |
| 2011/0309673 A1 | 12/2011 | Vigren | |
| 2012/0103704 A1 | 5/2012 | Beasley | |
| 2013/0233628 A1 | 9/2013 | Moser | |
| 2014/0070604 A1 | 3/2014 | De Palma | |
| 2014/0144716 A1 | 5/2014 | Stanski et al. | |
| 2014/0265549 A1 | 9/2014 | Anderfaas et al. | |
| 2014/0324301 A1 | 10/2014 | Rebinsky | |
| 2015/0175226 A1 | 6/2015 | Argenziano et al. | |
| 2015/0217818 A1 | 8/2015 | Vik et al. | |
| 2016/0176455 A1 | 6/2016 | Nuechterlein et al. | |
| 2016/0311481 A1 | 10/2016 | Grant et al. | |
| 2016/0318566 A1 | 11/2016 | Coombs et al. | |
| 2017/0217517 A1 | 8/2017 | Lamela et al. | |
| 2017/0225727 A1 | 8/2017 | Lafreniere et al. | |
| 2017/0274947 A1 | 9/2017 | Haugen | |
| 2018/0022407 A1 | 1/2018 | Gingras et al. | |
| 2018/0037281 A1 | 2/2018 | Edelin et al. | |
| 2018/0118290 A1 | 5/2018 | Vik et al. | |
| 2019/0039666 A1 | 2/2019 | Hutsick et al. | |
| 2021/0362791 A1 * | 11/2021 | West | B62D 55/065 |

FOREIGN PATENT DOCUMENTS

| | | | |
|---|---|---|---|
| CN | 103264732 A | 8/2013 | |
| CN | 204161505 U | 12/2014 | |
| CN | 205620063 U | 10/2016 | |
| CN | 207617836 U | 7/2018 | |
| CN | 208278186 U | 12/2018 | |
| DE | 1555539 A1 | 11/1970 | |
| DE | 4423364 A1 | 2/1995 | |
| DE | 102004005090 A1 | 8/2005 | |
| DE | 102017002163 A1 | 3/2017 | |
| DE | 102017002163 A1 * | 9/2018 | |
| DE | 102018104501 A1 | 8/2019 | |
| EP | 0008907 A1 | 3/1980 | |
| EP | 2251251 A1 | 11/2010 | |
| JP | 5579766 A2 | 6/1980 | |
| WO | WO-2016161528 A1 * | 10/2016 | B62D 55/12 |
| WO | 17075652 A1 | 5/2017 | |
| WO | 18024758 A3 | 2/2018 | |
| WO | 18139836 A2 | 8/2018 | |
| WO | 19015817 A1 | 1/2019 | |

OTHER PUBLICATIONS

John Deere, Brochure, Undercarriage Wear and Care Guide, Oct. 2014 (12 pages).

Schaeffler Technologies, Brochure, Outstanding Power Density, PWG Planetary Screw Drive, undated admitted prior art. (2 pages).

* cited by examiner

ACTIVE TRACK-CHAIN SAG MANAGEMENT SYSTEMS FOR CRAWLER VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to active track-chain sag management systems, which automatically adjust track-chain tension and sag utilizing electrically-driven track-chain tensioning devices integrated into the tracked undercarriages of crawler vehicles.

BACKGROUND OF THE DISCLOSURE

Crawler vehicles (that is, work vehicles having tracked undercarriages) are utilized to perform tasks in various industries. In the construction industry, for example, dozers, excavators, cranes, and certain loaders are equipped with tracked undercarriages and thus considered "crawler vehicles." The tracked undercarriage of a crawler vehicle provides high tractive force and stability, but also typically requires frequent maintenance to ensure proper operation, minimize component wear, and prolong undercarriage lifespan. Further, the rate of component wear and undercarriage lifespan is highly dependent upon maintaining an appropriate degree of track-chain sag given current ground conditions, component wear, material build-up, and other factors. Component wear is exacerbated by track over-tensioning, while the rate of fuel consumption and horsepower demands placed on the vehicle engine are also increased. Conversely, crawler vehicle performance can be degraded by excessive vibration and other issues when the track-chain is permitted to become excessively loose. Track-sag maintenance procedures are complicated by dynamic factors, such as constantly changing track tension, variance in ground conditions, gradual component wear, and material packing between mating components.

Conventionally, the track-chain sag of a tracked undercarriage is regulated through adjustments to track-chain tension, as set manually utilizing a hydraulic idler wheel device. The idler wheel device includes an idler wheel around which the track-chain extends, as well as a hydraulic cylinder mounted between the idler wheel and an attachment point on the track frame. As the hydraulic cylinder is filled with grease or another hydraulic fluid, the piston of the cylinder extends to further engage the idler wheel into the track, increasing track-chain tension and decreasing track-chain sag. To achieve a desired track-chain tension and sag, an operator adjusts cylinder extension by manually adding or removing hydraulic fluid from the hydraulic cylinder utilizing, for example, a grease gun. Maintenance routines typically require an operator to check track-chain tension and sag, and adjust hydraulic fluid volume accordingly, on a daily basis; e.g., each morning prior to operation of the crawler vehicle. Similarly, an operator may be required to adjust track-chain tension and sag when an appreciable variation in the underfoot conditions of the crawler vehicle occurs due to, for example, a change in ground moisture levels.

SUMMARY OF THE DISCLOSURE

Active track-chain sag management system are disclosed for usage in conjunction with crawler vehicles having tracked undercarriages. In embodiments, the active track-chain sag management system includes a movable track-engaging member positioned for physical engagement into a track-chain of the tracked undercarriage, an electric drive assembly controllable to adjust a track-tensioning position of the movable track-engaging member relative to the track-chain, and a controller operatively coupled to the electric drive assembly. The controller is configured to command the electric drive assembly to repeatedly adjust the track-chain sag of the track-chain by varying the track-tensioning position of the movable track-engaging member during operation of the tracked undercarriage.

In further embodiments, the active track-chain sag management system includes a planetary screw drive, an idler wheel, and an electric motor having a motor output shaft. The planetary screw drive includes, in turn, a threaded spindle coupled to the motor output shaft for rotation about a central axis, as well as a translating nut configured to translate along the central axis in response to rotation of the threaded spindle. The idler wheel is fixedly coupled to the translating nut and moves therewith along the central axis. The idler wheel engages into a track-chain of the tracked undercarriage to increase track-chain tension and decrease track-chain sag of the track-chain as the idler wheel is advanced along the central axis in a direction opposite the electric motor.

In still further implementations, the active track-chain sag management system includes a movable track-engaging member positioned for physical engagement into a track-chain of the tracked undercarriage, an electric drive assembly including an electric motor controllable to adjust a track-tensioning position of the movable track-engaging member relative to the track-chain, and a controller operatively coupled to the electric drive assembly. The controller is configured to: (i) establish a target track-chain tension ($T_{TARGET}$) corresponding to a desired track-chain sag of the tracked undercarriage; (ii) estimate a current track-chain tension ($T_{CURRENT}$) of the track-chain during operation of the tracked undercarriage based, at least in part, on a current torque output of the electric motor; and (iii) generate an alert if a difference between the target track-chain tension ($T_{TARGET}$) and the current track-chain tension ($T_{CURRENT}$) exceeds a predetermined threshold value.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

Overview

As previously noted, maintenance routines for the tracked undercarriages of crawler vehicles often require an operator to check and adjust track-chain tension on a frequent (e.g., daily) basis to ensure proper track-chain tension and sag. By conventional design, track-chain tension is passively set by positioning an idler wheel relative to the track-chain of the crawler vehicle undercarriage. Idler wheel position adjustments are performed through a manual process in which an operator exits the operator station or cabin of the crawler vehicle, gauges the current track-chain tension, determines any appropriate adjustments to achieve an optimal or target track-chain sag, and then varies the amount of hydraulic fluid within a hydraulic cylinder within the idler wheel device to adjust the position of the idler wheel as needed to achieve the target track-chain sag. To add or remove hydraulic fluid from the hydraulic cylinder, the operator is further typically required to remove a track cover from the undercarriage track frame to access a hydraulic fluid port fluidly coupled to the cylinder. The operator then utilizes a manual tool (e.g., a grease gun when the hydraulic fluid is grease) to vary the volume of hydraulic fluid within the hydraulic cylinder before reinstalling the track cover, verifying that the proper track-chain sag has been achieved, and then returning to the cabin of the crawler vehicle.

Such maintenance requirements are time consuming and often burdensome to crawler vehicle operators, particularly in poor weather or ground conditions. Requiring such intensive and frequent manual maintenance increases the likelihood of introducing human error into track-chain sag adjustments, while also the potential for non-compliance. Further, it may be difficult for an operator to determine when ground conditions vary to the extent warranting an operator to cease operation of the crawler vehicle, exit the crawler vehicle, and adjust track-chain sag before resuming crawler vehicle usage. An ongoing industry demand thus persists for track-chain sag management systems capable of reducing operator maintenance requirements pertaining to crawler vehicle undercarriages, while better ensuring that optimal track-chain tension and sag are maintained over prolonged periods of time.

In satisfaction of this industry demand, active track-chain sag management systems are disclosed for automatically adjusting track-chain tension and sag during operation of a crawler vehicle. The below-described active track-chain sag management systems adjust track-chain sag utilizing electrically-driven track-chain tensioning devices integrated into the crawler vehicle undercarriage. In embodiments, the electrically-driven track-chain tensioning device includes a track-engaging member, such as an idler wheel, which is engaged into the track-chain of the crawler vehicle undercarriage to adjust track-chain tension and achieve an optimal track-chain sag. The position of the track-engaging member (e.g., idler wheel) is, in turn, adjusted utilizing an electric drive assembly containing an electric motor in signal communication with a controller. In many instances, the electric drive assembly moves the track-engaging member (e.g., idler wheel) into the track-chain along a substantially linear axis in response to command signals received from the controller. In such instances, the electric drive assembly is more fully referred to herein as a "linear electric drive assembly."

In addition to the electric motor, the linear electric drive assembly includes one or more devices for performing the following functions: (i) converting rotation of an output shaft of the electric motor to linear movement of the track-engaging member (e.g., idler wheel), and (ii) amplifying the linear force at which the idler wheel is engaged into the track-chain relative to the torque output of the motor. In certain implementations, both of these functions are achieved utilizing a single device, such as a planetary screw drive. In other embodiments, such functions may be achieved utilizing multiple devices, such as a planetary gear system having a rotary output paired with a ball screw or other rotary-to-linear conversion device. The usage of a planetary gear system (whether in the form of planetary gear screw or a planetary gear system having a rotary output) having a high gear reduction enables the track-engaging member (e.g., idler wheel) to be pressed axially into the track-chain at sufficiently high axial forces (e.g., forces approaching or exceeding 100 kilonewtons (kN)) to provide the desired track-chain tensioning function, while utilizing an electric motor having a comparatively low torque output (e.g., a torque output less than 100 newton-meters (Nm)). This, in turn, permits the usage of low voltage electric motor within the track-chain tensioning device, such as a direct current electric motor operable at a "touch-safe" voltage of 60 volts (V) or less. The usage of a low voltage electric motor is well-suited for deployment within the undercarriage of a crawler vehicle, which is electrically grounded, exposed to water and other environmental contaminants, and is subject to exceptionally harsh operating conditions. Additionally, such low voltage electric motors are readily commercially available at relatively modest cost.

The usage of an electric motor as a prime mover controlling engagement of the track-engaging member (e.g., idler wheel) into the track-chain of a crawler vehicle undercarriage provides other benefits, as well. For example, such an electric motor can perform track-chain tension and sag adjustments in a relatively rapid manner (e.g. as opposed to a hydraulic system) permitting near real-time or on-the-fly track-chain sag adjustments during operation of the crawler vehicle. The responsiveness of the electric motor and, more generally, the electrically-driven track-chain tensioning device enables additional functionalities previously unobtained or impractical, such as the ability to adjust track-chain tension and sag as the crawler vehicle transitions between traveling in a forward direction (in which case a greater chain-track sag may be desired) and traveling in a backward direction (in which case a lesser chain-track sag may be desired). Active track-chain tension and sag adjustments can also be implemented in response to other dynamically changing conditions, such as variations in ground moisture conditions.

As a still further benefit, the electric motor within the track-chain tensioning device can be leveraged as a torque sensor. This is advantageous in that, by sensing the current torque output of the electric motor, the controller can convert the current torque output to an estimated track-chain tension and, therefore, a track-chain sag. The controller may then adjust the current track-chain tension ($T_{CURRENT}$)) as needed, to better correspond with an ideal or target track-chain tension ($T_{TARGET}$). In other embodiments, the electric motor may not be utilized as a torque sensor; and the controller may estimate the current track-chain tension ($T_{CURRENT}$) of a given crawler undercarriage track in a different, such as by utilizing an another (e.g., torque or strain) sensor mechanically coupled to the drive sprocket or the final drive of the undercarriage.

During operation of the active track-chain sag adjustment system, the controller commands the electric drive assembly to adjust the track-chain sag of the track-chain on repeated or iterative basis by varying the track-tensioning position of the movable track-engaging member (e.g., idler wheel). In one possible control scheme, the controller may perform such adjustments by first establishing a target track-chain tension ($T_{TARGET}$) corresponding to a desired track-chain sag of the tracked undercarriage. The target track-chain tension ($T_{TARGET}$) can be recalled from memory, determined from operator input, or otherwise established, and potentially adjusted in view of relevant sensor data (e.g., sensor data indicative of current ground conditions). The controller then repeatedly estimate a current track-chain tension ($T_{CURRENT}$) of the track-chain during operation of the tracked undercarriage, conveniently (although non-essentially) based on a torque output of the electric motor. In embodiments, the controller may delay rendering such an estimate until the crawler vehicle has traveled in a forward or backward direction for a predetermined duration (e.g., about 5 seconds) since the last process iteration to allow settling of the track-chain. Lastly, the controller commands the electric drive assembly to adjust the track-tensioning position of the movable track-engaging member to reduce disparities between the target track-chain tension ($T_{TARGET}$) and the current track-chain tension ($T_{CURRENT}$).

Through the performance of the above-described control scheme, embodiments of the active track-chain sag adjustment system may ensure an optimal track-chain sag level during operation of a crawler vehicle in an active, intelligent, independent manner without requiring operator involvement. The undercarriage lifespan of the crawler vehicle is maximized as a result, while operator maintenance requirements are greatly reduced, if not eliminated. Further description of suitable control schemes that may be carried-out by the controller in operating the electrically-driven track-chain tensioning device are described below in connection with FIGS. 4 and 5. First, however, an example active track-chain sag management system utilized in conjunction with a tracked undercarriage is described in connection with FIGS. 1-3.

Example Tracked Undercarriage and Active Track-Chain Sag Management System

Figure 1:
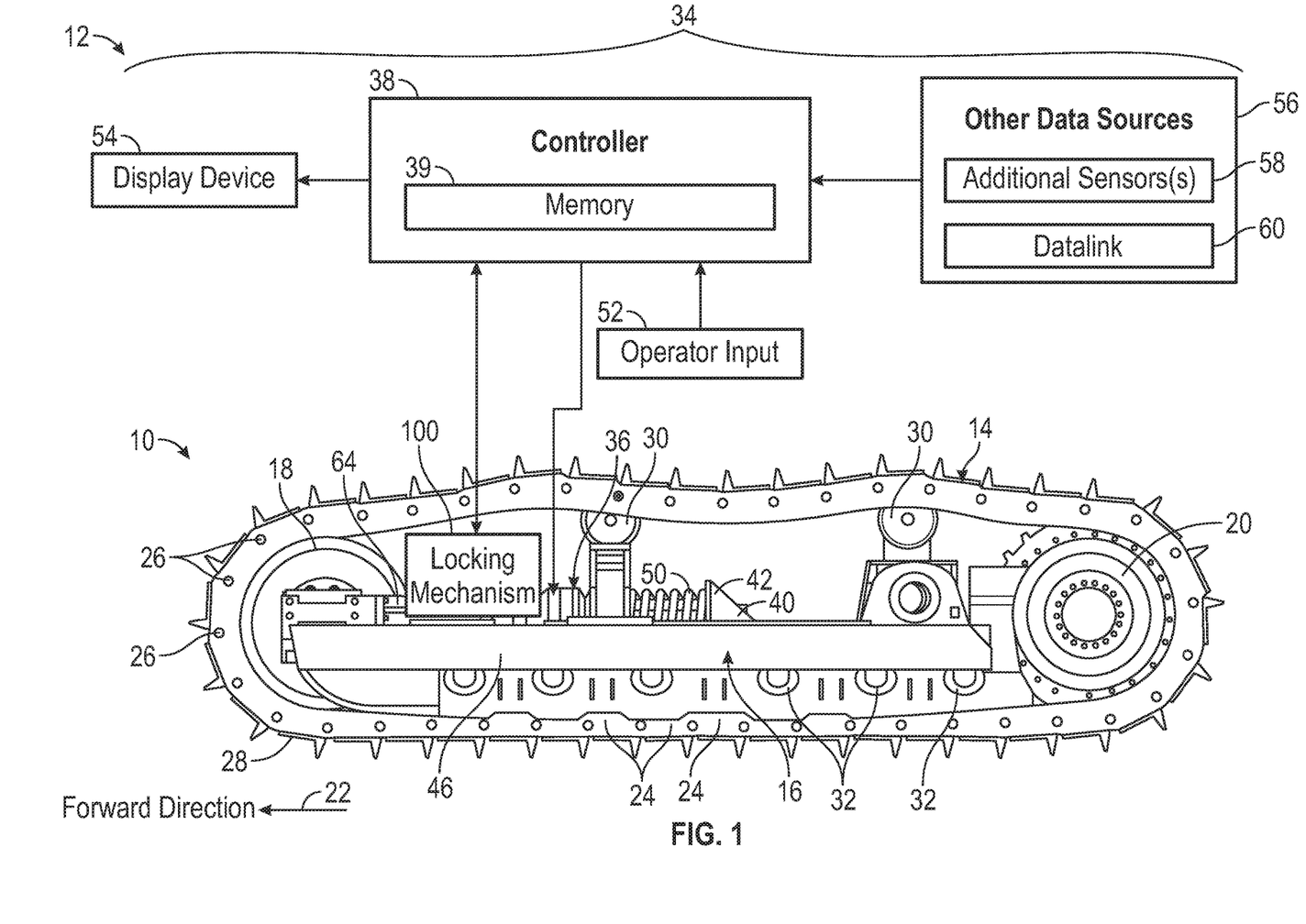
FIG. 1 is a schematic of a tracked undercarriage (partially shown) and an active track-chain sag management system for adjusting the track-chain tension and sag of an undercarriage track-chain, as illustrated in accordance with an example embodiment.

Referring to FIG. 1, a tracked undercarriage 10 of a crawler vehicle (not shown) and an active track-chain sag management system 12 is schematically presented in accordance with an example embodiment of the present disclosure. The example tracked undercarriage 10 can be integrated into or support any type of crawler vehicle including, but not limited to, tracked loaders, dozers, excavators, cranes, and other crawler vehicles utilized within the construction, agricultural, mining, and forestry industries. Further, while described below in the context of the tracked undercarriage 10 to provide an example context in which the active track-chain sag management system 12 may be better understood, embodiments of the active track-chain sag management system 12 can be utilized in conjunction with various other types of tracked undercarriages.

The example tracked undercarriage 10 includes a track-chain 14 extending around the outer periphery of a track frame 16. An idler wheel 18 and a drive sprocket 20 are rotatably mounted to longitudinally-opposed end portions of the track frame 16. Specifically, the idler wheel 18 is mounted to a forward or leading end portion of the track frame 16, as indicated by a directional arrow 22 in the lower left corner of FIG. 1. Conversely, the drive sprocket 20 is mounted to a rear or trailing end portion of the track frame 16. The drive sprocket 20 includes sprocket teeth, which project from the outer periphery of the sprocket 20 to engage into the track-chain 14 along its inner periphery. The track-chain 14 includes a series of pivotally-connected track links 24, which are joined by pins and bushing 26 and which are outfitted with a number of outer track shoes 28. The track-chain 14 is further supported by a number of carrier rollers 30, which are spaced along an upper portion or topside of track frame 16; and a plurality of roller wheels 32, which are spaced along a lower portion or longitudinal edge of the track frame 16.

The example active track-chain sag management system 12 includes a control sub-system 34 and an electrically-driven track-chain tensioning device 36. The control sub-system 34 (and, specifically, the below-described controller 38 included in the control sub-system 34) is operably coupled to one or more components of the electrically-driven track-chain tensioning device 36, which is integrated into the tracked undercarriage 10 as shown. The electrically-driven track-chain tensioning device 36 may include a trailing or aft end portion, which is mounted to the track frame 16 at a fixed attachment point 40. In embodiments, a connector bracket 42 may be affixed to the track frame 16 and include certain interface features (e.g., a bore for receiving the below-described end piece 44 of the electrically-driven track-chain tensioning device 36) to mount the electrically-driven track-chain tensioning device 36 to the track frame 16. Additionally, and as also described below, the track frame 16 may include an elongated side rail 46 along which one or more components of the track-chain tensioning device 36 (e.g., the below-described shuttle or slider piece 48) may slide as the idler wheel 18 translates relative to track frame 16 of the tracked undercarriage 10. The positioning of the idler wheel 18 is largely determinative of the tension and sag of the track-chain 14, noting that some variance in the idler wheel position will also occur during crawler vehicle operation due to the provision of the below-described recoil spring 50.

In contrast to the electrically-driven track-chain tensioning device 36, many of the components of the control sub-system 34 are usefully (although non-essentially) remotely located from the tracked undercarriage 10; e.g., integrated into the operator station of the crawler vehicle. Such remote positioning helps protect such components from the harsh operating environment of the tracked undercarriage 10. As an exception to this general statement, the below-described locking mechanism 100 (when included within the active track-chain sag management system 12) will typically be integrated into the tracked undercarriage 10 at a location adjacent the electrically-driven track-chain tensioning device 36. Additionally, when the additional sensors 58 (also described below) include an independent sensor for gauging the current track-chain tension (e.g., a torque or strain sensor mechanically joined to the drive sprocket 20 or the final drive), such a sensor can also potentially be integrated into the tracked undercarriage 10.

The example control sub-system 34 of the active track-chain sag management system 12 will now be discussed in greater detail. In addition to the controller 38, the control sub-system 34 may include one or more of the following components: (i) an operator interface 52, (ii) at least one display device 54, and (iii) any number of other data sources 56 for providing data to the controller 38 useful in implementing in the below-described control schemes. In this latter regard, and as generically indicated on the right of FIG. 1, the other data sources 56 may include one or more additional sensors 58, such as a discrete torque or strain sensor further integrated into the tracked undercarriage 10 (e.g., coupled to the drive sprocket 20 or to a component of the final drive) and providing data to the controller 38 for usage in monitoring the current tension of the track-chain 14. Additionally or alternatively, the example control sub-system 34 may include a datalink 60, such as a radiofrequency (RF) transceiver, permitting wireless data transmission and reception. When present, the datalink 60 may receive wireless transmissions including information indicative of current ground conditions, optimal track-chain tension values, and other such data, which the datalink 60 may then convey to the controller 38 for consideration in implementing any desired control scheme. In such embodiments, a centralized source or command center can potentially transmit such data to a fleet of crawler vehicles operating in particular region or area.

The controller 38 of the active track-chain sag management system 12 can assume any form suitable for performing the functions described throughout this document. Further, the term "controller," as appearing herein, is utilized in a non-limiting sense to generally refer to the processing architecture of active track-chain sag management system 12. The controller 38 can encompass or may be associated with any practical number of processors, control computers, computer-readable memories, power supplies, storage devices, interface cards, and other standardized components. The controller 38 may also include or cooperate with any number of firmware and software programs or computer-readable instructions designed to carry-out the various process tasks, calculations, and control/display functions described herein. Such computer-readable instructions may be stored within a non-volatile sector of a memory 39 accessible to the controller 38. While generically illustrated in FIG. 1 as a single block, the memory 39 can encompass any number and type of storage media suitable for storing computer-readable code or instructions, as well as other data utilized to support the operation of the active track-chain sag management system 12. The memory 39 may be integrated into the controller 38 in embodiments as, for example, a system-in-package, a system-on-a-chip, or another type of microelectronic package or module.

When included in the example control sub-system 34, the display device 54 may be located within the operator station or cabin of the crawler vehicle positioned atop the tracked undercarriage 10. An operator may refer to imagery generated on the display device 54 when entering commands or inputting data into the control sub-system 34 to, for example, specify current ground conditions or to manually set the below-described track-chain sag or tension target value. Additionally or alternatively, visual alerts may be generated on the display device 54 when, for example, a relatively sizable disparity is detected between the current track-chain tension and a target value for the track-chain tension, particularly in the event of deactivation of the active track-chain sag regulation functionality, as discussed below in conjunction with FIG. 5. When included in the active track-chain sag management system 12, the display device 54 may be affixed to the static structure of the operator cabin and realized in a head-down display (HDD) configuration. In other instances, the display device 54 can assume the form of a portable electronic display device, such as a tablet computer or laptop, which is carried into the operator station by an operator and which communicates with the various other components of the example control sub-system 34 over a physical connection or wireless connection to perform the desired display functionalities. Finally, the operator interface 52 can include any device or group of devices allowing the entry of operator input in controlling the operation of the active track-chain sag management system 12 including, but not limited to, various physical inputs and devices (e.g., cursor input devices) for interacting with Graphical User Interface (GUI) elements generated on the display device 54.

Figure 2:
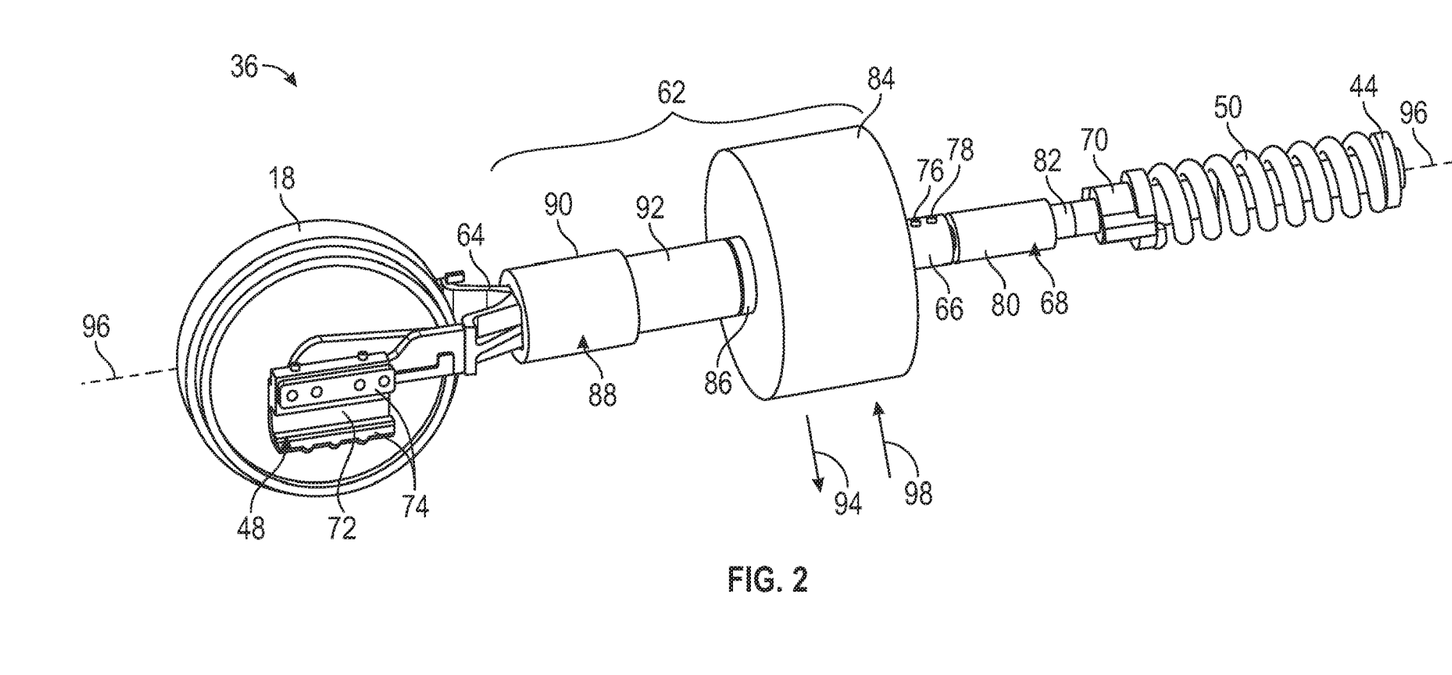
FIG. 2 is a simplified isometric view of an example electrically-driven track-chain tensioning device, which may be included in the active track-chain sag management system and integrated into the tracked undercarriage shown in FIG. 1.

Progressing to FIG. 2, an example embodiment of the electrically-driven track-chain tensioning device 36 is illustrated in a generalized manner. In the illustrated example, the electrically-driven track-chain tensioning device 36 includes a movable track-engaging member 18, an electric drive assembly 62, and various additional components. Here, the movable track-engaging member 18 assumes the form of an idler wheel and is consequently referred to more specifically as the "idler wheel 18" following this paragraph. The present example notwithstanding, the movable track-engaging member 18 can assume other forms in alternative embodiments, providing that the member 18 can be pressed into or otherwise physically engaged into the track-chain 14 to control track-chain tension and sag in the manner described herein. Similarly, as the electric drive assembly 62 assumes the form of a linear electric drive assembly in the illustrated example (that is, an electric drive assembly configured to move the idler wheel 18 into engagement with the track-chain 14 substantially along a linear axis), the electric drive assembly 62 is referred to hereafter as "linear electric drive assembly 62." In alternative embodiments, the electric drive assembly 62 may move the track-engaging member 18

(hereafter, the idler wheel 18) into engagement with the track-chain 14 along a non-linear motion path, such as curved motion path.

In addition to the idler wheel 18 and the linear electric drive assembly 62, the electrically-driven track-chain tensioning device 36 includes the following components (moving from left to right in FIG. 2): (i) a shuttle or slider piece 48, (ii) a yoke 64, (iii) a ported adapter piece 66, (iv) a hydraulic cylinder 68, (v) a cylinder-spring adapter 70, (vi) a recoil spring 50, and (vii) a trailing end piece 44. Addressing first the slider piece 48, this component includes a longitudinal channel 72 for receiving a mating longitudinal ridge provided on the interior of the side rail 46 of the tracked undercarriage 10 (FIG. 1). The slider piece 48 may thus slide along the side rail 46 to guide linear movement of the idler wheel 18 during operation of the electrically-driven track-chain tensioning device 36. Wear bars 74 are also provided adjacent the channel 72. The yoke 64 connects the linear electric drive assembly 62 (in particular, a translating nut 90 of the linear electric drive assembly 62, as described below) to the slider piece 48 and to a central pin or axle (hidden from view in FIG. 2) about which the idler wheel 18 rotates.

The ported adapter piece 66 includes a hydraulic fluid port 76 fluidly coupled to the interior of the hydraulic cylinder 68, which is mechanically coupled in series with the linear electric drive assembly 62. The hydraulic cylinder 68 has a cylinder body from which a rod or piston 82 extends. As grease (or another hydraulic fluid) is introduced into the interior of the cylinder body 80 through the hydraulic fluid port 76, the piston 82 of the hydraulic cylinder 68 extends. Hydraulic fluid can thus be added to or removed from the hydraulic cylinder 68 to set the piston stroke and, therefore, the general positioning of the idler wheel 18. Beneficially, the ability to further control idler wheel positioning through manual adjustment to the hydraulic fluid volume within the hydraulic cylinder 68 may provide some degree of redundancy in the unlikely event that the linear electric drive assembly 62 should fail, although (depending on the sizing of the hydraulic cylinder 68) the stroke capabilities of the piston 82 may or may not permit adjustment of the idler wheel 18 over its full motion range in embodiments. When permitted via the hydraulic fluid port 76 and the hydraulic cylinder 68, such a manual adjustment process mimics the process for manually setting idler wheel positioning in conventional systems and, therefore, is generally familiar to crawler vehicle operators. Such benefits notwithstanding, the hydraulic fluid port 76 may be omitted in further embodiments of the linear electric drive assembly 62; however, the hydraulic cylinder 68 and the below-described relief valve 78 are advantageously retained even in the absence of the hydraulic fluid port 76 to protect the tracked undercarriage 10 from severe over-tensioning of the track-chain 14, as described below.

In the illustrated example, the ported adapter piece 66 further includes a second port outfitted with a relief valve 78. The relief valve 78 is configured to open and allow the outflow of hydraulic fluid from the hydraulic cylinder 68, thereby enabling full retraction of the piston 82, should the pressure within the cylinder 68 surpass a high pressure threshold; e.g., 10,000 pounds-per-square inch (psi) in an embodiment. Should an exceptionally high compressive force be exerted axially through the electrically-driven track-chain tensioning device 36 sufficient to fully compress the recoil spring 50, the relief valve 78 will open to allow an additional decrease in the axial dimension of the electrically-driven track-chain tensioning device 36 (more informally, to allow shortening of the tensioning device 36) to protect the components of the tracked undercarriage 10 (e.g., the final drive) from damage. As an example, such a condition may occur should a relatively large object (e.g., a tree branch) become trapped in the tracked undercarriage 10 and pass between the idler wheel 18 or the drive sprocket 20 and the track-chain 14 during operation of the crawler vehicle. In such an instance, the cylinder-spring adapter 70 and the end piece 44 contact to provide a hard stop feature preventing over-compression of the recoil spring 50. A rigid body condition or state consequently occurs across the recoil spring 50, with the relief valve 78 then providing the over-tensioning prevention function by opening to permit hydraulic fluid outflow should the pressure within the hydraulic cylinder 68 exceed the predetermined threshold value, as previously described.

With continued reference to example embodiment illustrated in FIG. 2, the linear electric drive assembly 62 includes an electric motor 84 having a motor output shaft 86. The motor output shaft 86 is mechanically coupled to at least one additional device 88, which is, in turn, mechanically coupled to the idler wheel 18 through the yoke 64 and the slider piece 48. The at least one additional device 88 is configured to convert rotation of the motor output shaft 86 to linear movement of the idler wheel 18 and to amplify the linear force at which the idler wheel 18 is engaged into the track-chain 14 relative to the torque output of the electric motor 84. The device(s) 88 can assume various different forms for providing these key functions including, for example, a planetary gear system having a rotary output mechanically coupled to a rotary-to-linear motion conversion device, such as a ball screw. Both of these functions may be achieved utilizing a single device in embodiments. For example, as generically shown in FIG. 2, both of these functions are provided by a single device in the form of a planetary screw drive 88 in the illustrated embodiment. For this reason, the device(s) 88 are referred to as the "planetary screw drive 88" hereafter. Again, this description is provided by way of non-limiting example only, noting that other device or device pairs can be utilized to provide these functions in other implementations of the electrically-driven track-chain tensioning device 36.

The planetary screw drive 88 includes a translating nut 90 and a threaded shaft or spindle 92 along which the nut 90 moves. The electric motor 84 rotates the motor output shaft 86 to turn the threaded spindle 92 and drive linear movement of the translating nut 90, with the command signals issued from the controller 38 represented in FIG. 2 by an arrow 94. The motor output shaft 86 and the threaded spindle 92 rotate about a central axis 96, which is co-axial with the linear axis along which the idler wheel 18 translates. As previously noted, the translating nut 90 is mechanically joined to the idler wheel 18 by the yoke 64 and, therefore, the idler wheel 18 moves axially in conjunction with the translating nut 90 along the central axis 96. The idler wheel 18 thus engages into the track-chain 14 of the tracked undercarriage 10 to increase track-chain tension and decrease track-chain sag of the track-chain 14 as the idler wheel 18 is advanced along the central axis 96 in a direction opposite the electric motor 84. Again, such movement of the idler wheel 18 is effectuated utilizing the electric motor 84 in response to commands 94 received from the controller 38 (FIG. 1). In embodiments, the electric motor 84 may also provide electrical feedback signals to the controller 38 (e.g., as indicated by an arrow 98 in FIG. 2), which the controller 38 may then utilize to, for example, estimate the tension and sag of the track-chain 14 as further discussed below in connection with FIG. 5.

In various embodiments, the active track-chain sag management system 12 further includes a locking mechanism 100 operably coupled to the controller 38 and located adjacent (or integrated into) electrically-driven track-chain tensioning device 36, as schematically shown in FIG. 1. When included in the active track-chain sag management system 12, the locking mechanism 100 can be selectively engaged by the controller 38 to lock the linear electric drive assembly 62, and specifically the nut 90 of the planetary screw drive 88, in a set translational position. The locking mechanism 100 can assume any form for providing this function and may, in an embodiment, be a spring-actuated, electrically-released braking device. The provision of the locking mechanism 100 is rendered somewhat less important via the inclusion of the planetary screw drive 88 within the linear electric drive assembly 62, noting that the planetary screw drive 88 may generally possess a high resistance to back-driving. This notwithstanding, the provision of the locking mechanism 100 may provide a number of benefits even when the linear electric drive assembly 62 includes such a planetary screw drive 88. Such benefits may include a reduction in the wear on the planetary screw drive 88 and redundancy should some degree of slippage occur within the planetary screw drive 88; e.g., due to the nature in which the below-described planetary rollers 110 loosely mesh with the threaded spindle 92.

Figure 3:
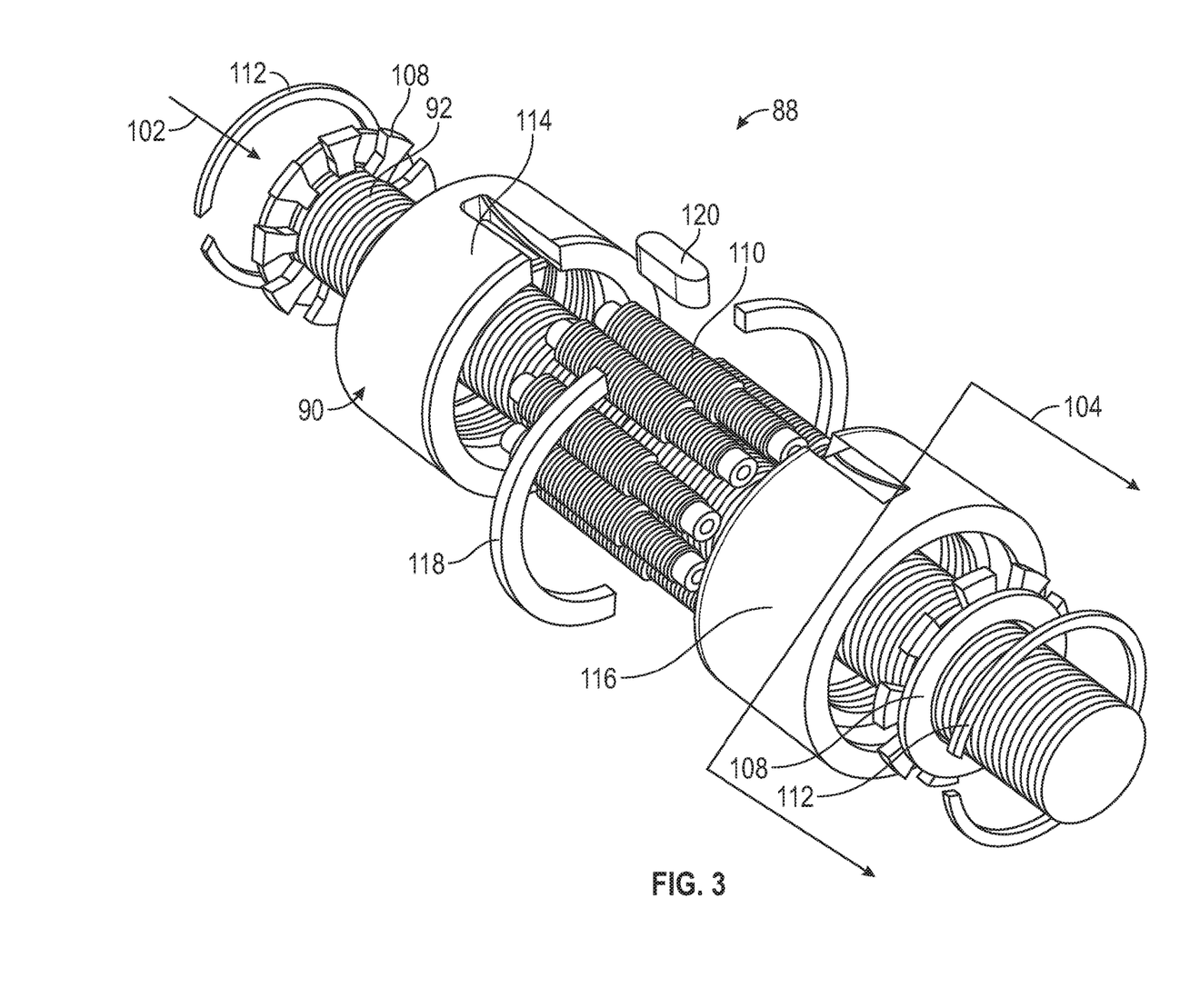
FIG. 3 is a partially-exploded isometric view of an example planetary screw drive suitably contained in the electrically-driven track-chain tensioning device in embodiments.

Turning to FIG. 3, an example embodiment of the planetary screw drive 88 is presented in a partially exploded view. Additionally, a first arrow 102 indicates the rotational input applied to the planetary screw drive 88 by the electric motor 84 when turning the motor output shaft 86. Similarly, the arrows 104 indicate the axial force output of the translating nut 90, and therefore the axial force at which the idler wheel 18 is pressed into the track-chain 14, in response to the rotational input provided by the electric motor 84. Discussing now the components of the example planetary screw drive 88, there is shown the threaded spindle 92, two planet rings 108, a plurality of planetary rollers 110, and two retaining rings 112. Further, as can be seen in this example, the translating nut 90 is split or divided into a first segment 114 and a second segment 116, which are separated by a spacer washer 118 when the planetary screw drive 88 is assembled. Additionally, a feather key 120 may be provided to help ensure angular alignment between the nut segments 114, 116. The feather key 120 may extend in a keyway (not shown) to prevent co-rotation of the translating nut 90 in conjunction with rotation of the screw drive shaft 92 and the threaded spindle 92 (FIG. 2). In other embodiments, the rotation of the translating nut 90 may be provided in another manner.

The planetary screw drive 88 provides a high gear reduction, which, in turn, allows the application of high axial loads urging linear movement of the idler wheel 18 into the track-chain 14, while enable the usage of a low torque output motor as the electric motor 84. This, in turn, allows the electric motor 84 to have a relatively low voltage for cost savings and safety optimization within the electrically-grounded tracked undercarriage 10. In embodiments, the electric motor may be operated at a relatively low voltage (e.g., a voltage of about 48V or about 60V) and at an adequate power level (e.g., about 10 kilowatts (kW)) to provide a torque output ranging from about 20 to about 200 Nm; and, perhaps, ranging from about 50 and about 100 Nm. Comparatively, the planetary screw drive 88 may be configured to convert such a torque output of the electric motor 84 to an axial force output ranging between 50 and 200 kN; and, perhaps, of approximately 140 kN in embodiments. In further implementations, the foregoing parameters may be greater than or less than the example ranges above.

The usage of such the planetary screw drive 88, as paired with a low voltage electric motor (e.g. the electric motor 84), is thus advantageous for the reasons described above. The usage of an electrically-based track-chain tension and sag adjustment system (as opposed to a hydraulic system) further avoids the usage of plumbing features, pumps, and other such components prone leakage and contamination. Additionally, the usage of the electric motor 84 (as opposed to a hydraulic system) enables rapid adjustments to idler wheel positioning, thereby enabling the active track-chain sag adjustment process 122 to adjust track-chain tension and sag in a highly responsive manner. This, in turn, permits the controller 38 to implement appropriate adjustments on an iterative, real-time or near real-time basis during operation of the crawler vehicle equipped with the tracked undercarriage 10. Description of example control schemes that may be performed by the controller 38 to adjust track-chain tension and sag during crawler operation will now be described in connection with FIGS. 4 and 5.

Figure 4:
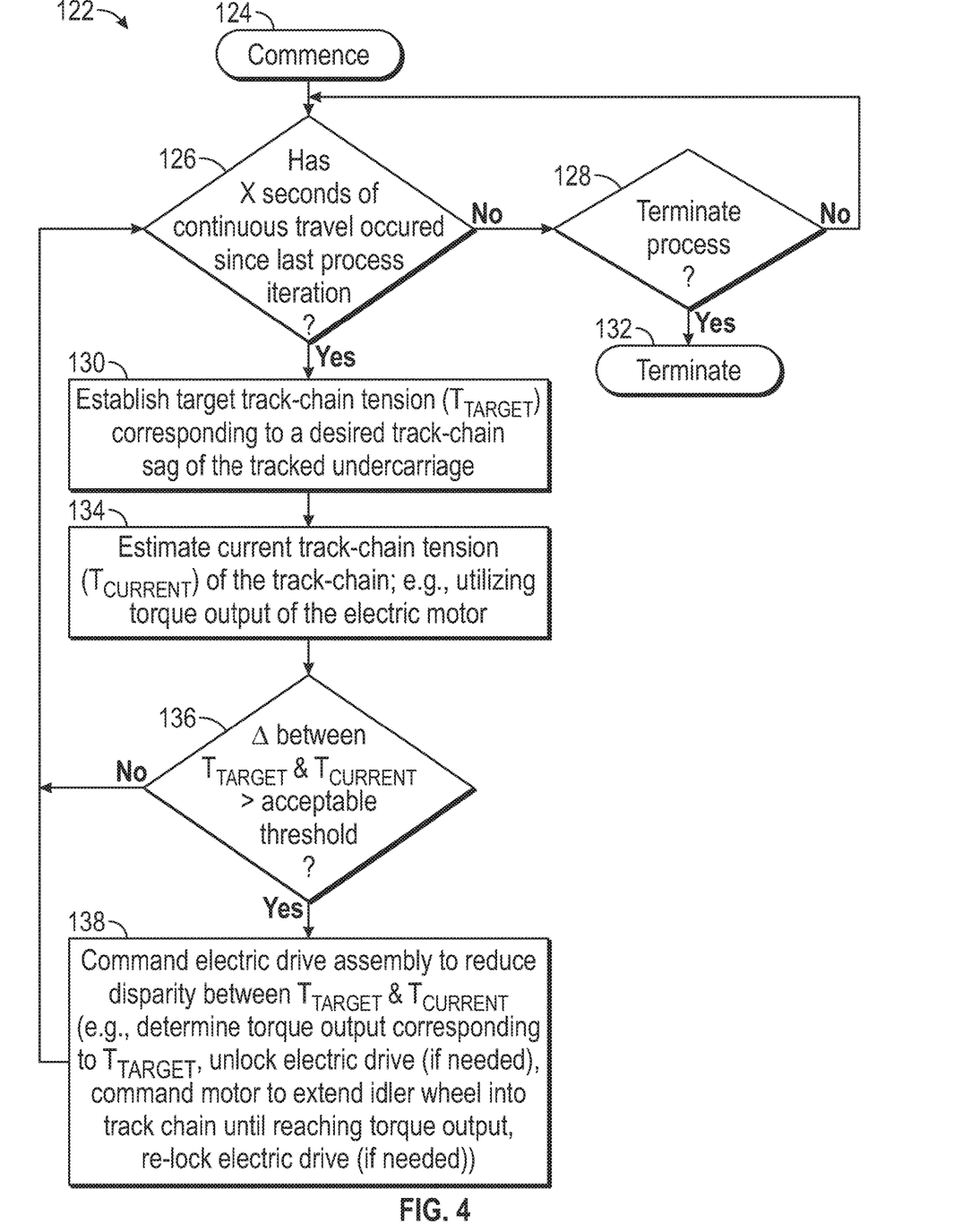
FIG. 4 is a flowchart setting-forth an example active track-chain sag adjustment process, which may be carried-out by a controller included in the active track-chain sag management system in embodiments.

Referring now to FIG. 4, an active track-chain sag adjustment process 122 is presented in accordance with a non-limiting example embodiment. The active track-chain sag adjustment process 122 can be carried-out by the controller 38 of the active track-chain sag management system 12 in embodiments of the present disclosure. The active track-chain sag adjustment process 122 includes a number of process STEPS 124, 126, 128, 130, 132, 134, 136, 138, each of which is described below. Depending upon the particular manner in which the active track-chain sag adjustment process 122 is implemented, each step generically illustrated in FIG. 4 may entail a single process or multiple sub-processes. Further, the steps illustrated in FIG. 4 and described below are provided by way of non-limiting example only. In alternative embodiments of the active track-chain sag adjustment process 122, additional process steps may be performed, certain steps may be omitted, and/or the illustrated process steps may be performed in alternative sequences.

The active track-chain sag adjustment process 122 commences at STEP 124 in response to the occurrence of a predetermined trigger event. In certain instances, the trigger event may simply be crawler startup or initial movement of the crawler vehicle following startup. In other instances, the active track-chain sag adjustment process 122 may be commence in response to a different trigger event, such as in response to operator input received via operator interface 52 indicating that the track-chain sag adjustment process 122 is desirably performed.

After commencing (STEP 124), the active track-chain sag adjustment process 122 advances to STEP 126. During this process step, the controller 38 determines whether a predetermined number of seconds of the tracked undercarriage 10, in either a forward or a reverse direction, has elapsed since the last iteration of the process 122. If this is not the case, the controller 38 progresses to STEP 128 and determines whether the process 122 should terminate, for example, due to operator deactivation. If determining that the process 122 should terminate, the controller 38 terminates the active track-chain sag adjustment process 122 accordingly (STEP 132). Otherwise, the controller 38 returns to STEP 126 of the active track-chain sag adjustment process 122. Through such process steps, the controller 38 ensures that the tracked undercarriage 10 has engaged in a predetermined number of seconds of continuous travel prior to performing the remainder of the process 122. Such a temporal buffer or wait period enables the track-chain 14 to settle and reach an appropriate physical state for estimating the current track-chain tension or sag of the tracked undercarriage 10, as described below. By way of non-limiting example, the controller 38 may determine whether the crawler vehicle has engaged in x seconds of continuous travel during STEP 126, with x ranging from 1 and 10 seconds, perhaps from about 3 and 7 seconds, and perhaps being equivalent to about 5 seconds in embodiment. In other instances, x may be greater than or less than the aforementioned ranges and value; or STEP 126 may be omitted from the process 122.

Next, at STEP 130 of the active track-chain sag adjustment process 122, the controller 38 establishes a target value for the track-chain tension ($T_{TARGET}$) to achieve a desired sag of the track-chain 14. The track-chain tension target ($T_{TARGET}$) may be established by the controller 38 in a number of different manners. For example, in certain embodiments, a default value may be recalled from the memory 39 during STEP 130. The default value may be adjusted, or perhaps overridden, in certain embodiments based upon operator input received the operator interface 52, based upon sensor data from the additional sensors 58, and/or based upon data or command signals received over the datalink 60 (e.g., data indicative of current ground conditions). Such input may specify the desired tension level of the track-chain 14; or, instead, may specify a desired sag of the track-chain 14, which the controller 38 may then convert into the desired the track-chain tension target ($T_{TARGET}$) in embodiments. When a desired track-sag value is specified, such a value may be expressed in terms of a linear measurement, such as a x (e.g., 2) inches. Manners in which chain-track sag is measured are well-established and generally involve measuring the low point of the chain-track sag along the topside of the track-chain 14. Additionally or alternatively, in embodiments, the default value for the track-chain tension target ($T_{TARGET}$) may be adjusted by a learning algorithms to optimize for a particular performance parameter, such fuel economy or omissions reduction. Further, in certain embodiments, the controller 38 may vary the chain sag target ($T_{TARGET}$) based upon whether the crawler vehicle is traveling in a forward or backward direction; e.g., the controller 38 may assign a lower track-chain tension and greater track-chain sag to prevent over-tensioning when traveling in a forward direction, while assigning a higher track-chain tension and a lesser track-chain sag to deter bunching of the track-chain 14 when traveling in a reverse direction.

After performing STEP 130 (or, in further embodiments, concurrent with or before performing STEP 130), the controller 38 advances to STEP 132 and estimates the current track-chain tension ($T_{CURRENT}$) of the tracked undercarriage 10. The controller 38 may render this estimate utilizing any suitable sensor input separate and apart from the electrically-driven track-chain tensioning device 36 in embodiments; e.g., a torque or stain sensor mechanically coupled to the drive sprocket 20 or to the final drive. In other instances, the controller 38 utilizes the electrically-driven track-chain tensioning device 36, and specifically the electric motor 84, to estimate the current track-chain tension of the tracked undercarriage 10. In this latter regard, the controller 38 may estimate the torque output of the electric motor 84 based on an electric characteristic of the motor 84, such as a magnitude of the electric (e.g., inverter) current supplied to the motor 84, depending upon the type of electric motor used. The usage of an electric machine (here, the electric motor 84) to provide a torque sensor functionality advantageously mitigates the need to provide another sensor in the harsh undercarriage environment; although the possibility that the active track-chain sag management system 12 may include one or more additional sensors integrated into the tracked undercarriage 10 in embodiments is not precluded. Further discussion of one manner in which the electric motor 84 may be leveraged as a torque sensor to estimate track-chain tension is set-forth below in conjunction with FIG. 5.

After estimating current track-chain tension ($T_{CURRENT}$) of the tracked undercarriage 10, the controller 38 progresses to STEP 136 of the active track-chain sag adjustment process 122. During this process step, the controller 38 determines whether the difference the current track-chain tension ($T_{CURRENT}$) and the track-chain tension target ($T_{TARGET}$) exceeds an acceptable threshold. In embodiments, this acceptable threshold may be adjustable and can have any suitable value, whether expressed as a fixed number or a percentage. If the difference between the current track-chain tension ($T_{CURRENT}$) and the track-chain tension target ($T_{TARGET}$) does not exceed the tolerance threshold, the controller 38 returns to STEP 126 of the active track-chain sag adjustment process 122. Otherwise, the controller 38 advances to STEP 138 and transmits appropriate command signals to the linear electric drive assembly 62 to reduce the disparity between the current track-chain tension ($T_{CURRENT}$) and the track-chain tension target ($T_{TARGET}$).

As just stated, during STEP 138, the controller 38 commands the electric motor 84 to move the idler wheel 18 into a desired track-tensioning position to achieve the desired track-chain tension and sag. When the position of the idler wheel 18 can be reliably determined with sufficient accuracy, the controller 38 may command the electric motor 84 to rotate the motor output shaft 86 and the threaded spindle 92 in a manner driving the nut 90, and therefore the idler wheel 18, into the track-tensioning position corresponding to the track-chain tension target ($T_{TARGET}$) In other instances, such as when the precise positioning of the idler wheel 18 may be difficult to reliably determine, the controller 38 can determine a target torque output ($T_{TARGET}$) corresponding to the track-chain tension target ($T_{TARGET}$) and then command the electric motor 84 to extend the idler wheel 18 until the target torque output ($T_{TARGET}$) is reached; e.g., as determined by the motor feedback represented by arrow 98 in FIG. 2. In this case, the controller 38 may disengage or unlock the locking mechanism 100, if present and currently engaged, prior to commanding the motor 84 to extend the idler wheel 18 further into the chain-track 14. Following extension of the idler wheel 18 to a point at which the target torque output ($T_{TARGET}$) is reached by the electric motor 84, and the controller 38 thus concludes that the desired track-chain sag has been achieved, the locking mechanism 100 is reengaged by the controller 38. In certain instances, the controller 38 may also command the electric motor 84 to rotate the motor output shaft 86 and the threaded spindle 92 such that the nut 90 and idler wheel 18 retracts before advancing the idler wheel 18 into the track-chain 14. Such an approach may be employed to better ascertain a current torque application of the electric motor 84 to position idler wheel 18 and therefore provide a more accurate measurement of the current track-chain tension for conversion to current track-chain tension ($T_{CURRENT}$) Further description in this regard is provided below in connection with FIG. 4.

Lastly, after conducting STEP 138, the controller 38 returns to STEP 126 to perform subsequent iterations of the active track-chain sag adjustment process 122, as previously-described. In this manner, the active track-chain sag adjustment process 122 is performed on an iterative basis to actively adjusted the tension of the track-chain 14, and therefore maintain track-chain sag at an optimal level, without requiring operator involvement (although an operator may potentially be permitted to enter data and/or active or deactivate the process 140, as previously described). Tracked undercarriage lifespan and performance parameters may be maximized as a result, while operator maintenance requirements are largely eliminated.

Figure 5:
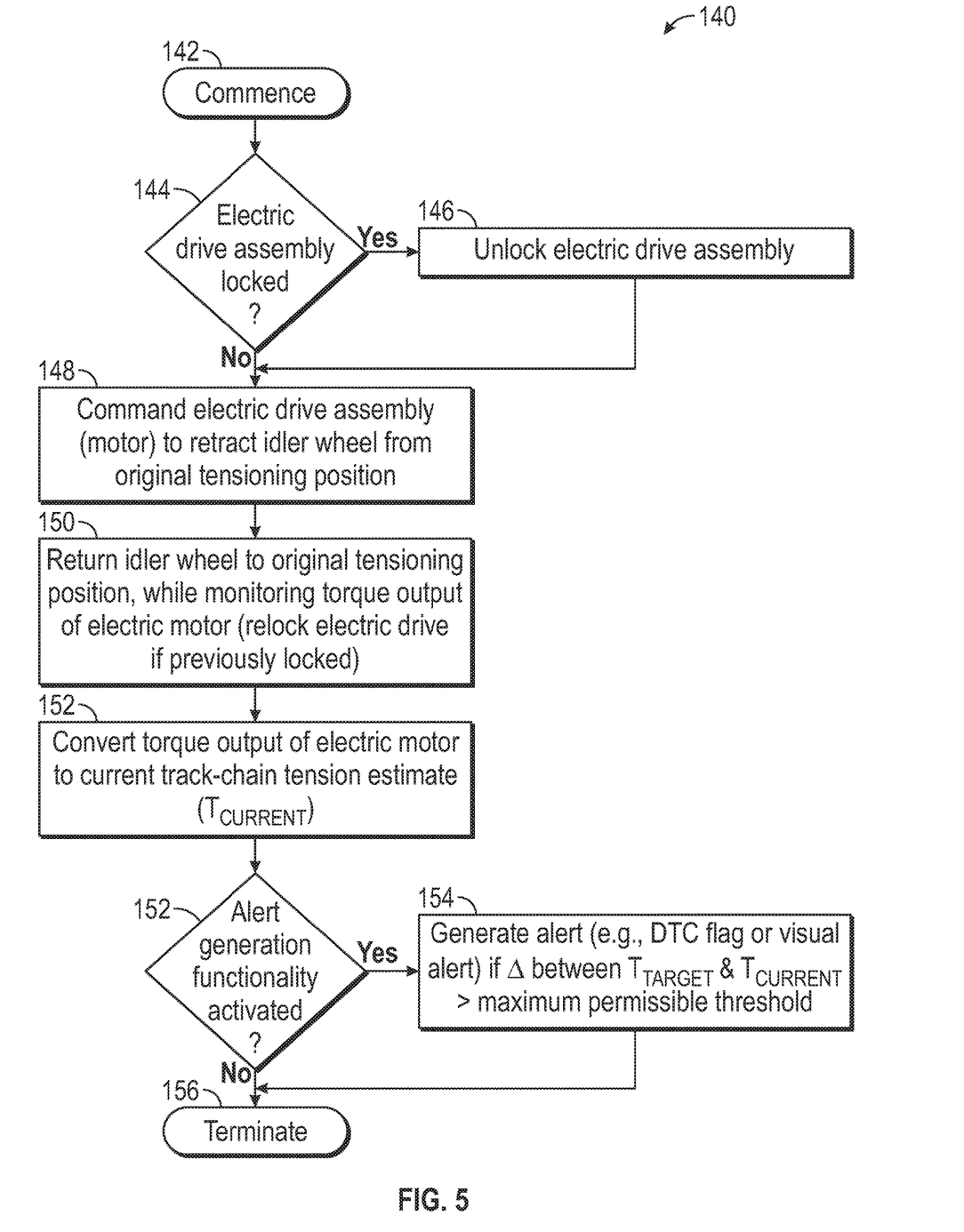
FIG. 5 is a flowchart presenting an example motor-based track-chain tension estimation sub-process suitably performed by the controller of the active track-chain sag management system, which can be conducted during the example active track-chain sag adjustment process set-forth in FIG. 4 in various implementations.

Addressing lastly FIG. 5, an example motor-based track-chain tension estimation sub-process 140 is presented. Once again, the motor-based track-chain tension estimation sub-process 140 includes a number of process STEPS 142, 144, 146, 148, 150, 152, 154, 156, each of which is described below. As was the case with the example active track-chain sag adjustment process 122, the steps shown in FIG. 5 are provided merely by way of example and can be reordered, selectively omitted, and modified to varying extents in further implementations of the process 122. The motor-based track-chain tension estimation sub-process 140 may be carried-out during STEP 130 of the active track-chain sag adjustment process 122. In alternative implementations, the motor-based track-chain tension estimation sub-process 140 may be conducted when the active track-chain sag adjustment process 122 is not performed to, for example, allow the generation of track-chain sag alerts of the type described below in connection with STEPS 152, 154.

After the sub-process 140 commences at STEP 142, the controller 38 progresses to STEP 144 and determines if the linear electric drive assembly 62 is currently locked. If the linear electric drive assembly 62 is currently locked, the controller 38 commands the locking mechanism 100 to unlock the linear electric drive assembly 62 (STEP 146) and then advances to STEP 148 of the sub-process 140. Conversely, if the linear electric drive assembly 62 is not locked, the controller 38 progresses directly to STEP 148. Of course, the STEPS 144, 146 may be omitted from the motor-based track-chain tension estimation sub-process 140 if the active track-chain sag management system 12 lacks the locking mechanism 100.

Next, at STEP 148, the controller 38 sends command signals to the electric motor 84 to retract the idler wheel 18 from its original (current) tensioning position. This is done to ensure that a physical load is exerted on the electric motor 84 such that the force exerted on the track-chain 14 by the idler wheel 18 can be measured without interference due to back-drive prevention of the planetary screw drive 88. Following this, at STEP 150 of the sub-process 140, the controller 38 commands the electric motor 84 to rotate the motor output shaft 86 and the threaded spindle 92 in a manner advancing the idler wheel 18 along the central axis 96 to return the idler wheel 18 to its original tensioning position. While the idler wheel 18 is moved in this manner, the controller 38 monitors the torque output of the electric motor 84 and captures the peak torque output applied by the motor 84 when the idler wheel 18 is fully returned to its original position. Also, after returning the idler wheel 18 to its original position, the linear electric drive assembly 62 can be relocked by reengaging the locking mechanism 100, if appropriate. Next, at STEP 152 of the sub-process 140, the controller 38 utilizes the measured peak torque output of the electric motor 84 when returning the idler wheel 18 to its original position to a track-chain tension and/or sag estimate. This may be done utilizing any suitable data structure, such as a two dimensional look-up table stored within the memory 39 accessible to the controller 38.

In certain instances, the motor-based track-chain tension estimation sub-process 140 may terminate after STEP 152; and return to the STEP 132 of the master process 122. Alternatively, in embodiments, the motor-based track-chain tension estimation sub-process 140 may further advance to STEP 154 in implementations in which track-chain sag alert or warning functionality is desired. In such instances, the controller 38 may initially determine whether an advisory alert generation functionality of the active track-chain sag management system 12 is currently activated during STEP 154. If the alert function is disabled, the controller 38 progresses to STEP 156 and sub-process 142 terminates. Conversely, if the alert generation functionality is currently activated, the controller 38 instead advances to STEP 156 and determines whether the difference between the current track-chain tension ($T_{CURRENT}$) and the track-chain tension target ($T_{TARGET}$) to an alert threshold. If the difference between these two values exceeds the alert threshold, the controller 38 generates a corresponding advisory alert. When generated, such an advisory alert can take various different forms including any combination of a diagnostic trouble code (DTC) indicator or flag and/or a visual alert generated on the display device 54. In particular, the flag or visual alert may advise the operator to cease operation of the crawler and perform maintenance on the tracked undercarriage 10 to resolve this disparity. Afterwards, the motor-based track-chain tension estimation sub-process 140 advances to STEP 158 and concludes in the manner previously described.

Enumerated Examples of the Active Track-Chain Sag Management System

The following examples of the active track-chain sag management system are further provided and numbered for ease of reference.

1. An active track-chain sag management system is provided for usage in conjunction with a crawler vehicle having a tracked undercarriage. In various embodiments, the active track-chain sag management system includes a movable track-engaging member positioned for physical engagement into a track-chain of the tracked undercarriage, an electric drive assembly controllable to adjust a track-tensioning position of the movable track-engaging member relative to the track-chain, and a controller operatively coupled to the electric drive assembly. The controller is configured to command the electric drive assembly to adjust the track-chain sag of the track-chain on an iterative basis by varying the track-tensioning position of the movable track-engaging member during operation of the tracked undercarriage.

2. The active track-chain sag management system of example 1, wherein the controller is further configured to: (i) establish a target track-chain tension ($T_{TARGET}$) corresponding to a desired track-chain sag of the tracked undercarriage; (ii) repeatedly estimate a current track-chain tension ($T_{CURRENT}$) of the track-chain during operation of the tracked undercarriage; and (iii) command the electric drive assembly to adjust the track-tensioning position of the movable track-engaging member to reduce disparities between the target track-chain tension ($T_{TARGET}$) and the current track-chain tension ($T_{CURRENT}$) if the disparity exceeds a predetermined threshold.

3. The active track-chain sag management system of example 2, wherein the electric drive assembly includes an electric motor having a torque output. The controller is coupled to the electric motor and is configured to estimate the current track-chain tension ($T_{CURRENT}$) of the track-chain based, at least in part, on the torque output of the electric motor.

4. The active track-chain sag management system of example 2, wherein the controller is further configured to: (i) determine when the tracked undercarriage engages in continuous travel for a predetermined time period; and (ii) estimate the current track-chain tension ($T_{CURRENT}$) of the track-chain in response to determining that the tracked undercarriage has engaged in continuous travel for the predetermined time period.

5. The active track-chain sag management system of example 2, further including an operator interface to which the controller is operably coupled. The controller is configured to establish the target track-chain tension ($T_{TARGET}$) based, at least in part, on operator input received via the operator interface.

6. The active track-chain sag management system of example 2, further including a data source providing data indicative of current ground conditions. The controller is configured to establish the target track-chain tension ($T_{TARGET}$) based, at least in part, on data indicative of current ground conditions.

7. The active track-chain sag management system of example 1, wherein the movable track-engaging member includes an idler wheel. The electric drive assembly includes a linear electric drive assembly configured to move the idler wheel into engagement with the track-chain along a substantially linear axis.

8. The active track-chain sag management system of example 7, wherein the linear electric drive assembly includes an electric motor and at least one device. The electric motor has a motor output shaft and a torque output. The at least one device is configured to convert rotation of the motor output shaft to substantially linear movement of the idler wheel and to amplify an axial force at which the idler wheel is engaged into the track relative to the torque output of the motor output shaft.

9. The active track-chain sag management system of example 8, wherein the at least one device assumes the form of a planetary screw drive.

10. The active track-chain sag management system of example 9, wherein the planetary screw drive includes a translating nut. The active track-chain sag management system further includes a locking mechanism configured to prevent translational movement of the translating nut when the locking mechanism is engaged. The controller is operably coupled to the locking mechanism and configured to engage the locking mechanism after commanding the electric drive assembly to adjust the track-tensioning position of the movable track-engaging member.

11. The active track-chain sag management system of example 1, wherein the electric drive assembly includes an electric motor having a torque output between about 20 to about 200 Nm, while the electric drive assembly is configured to engage the idler wheel into the crawler track at an axial force ranging between 50 and 200 kN.

12. The active track-chain sag management system of example 1, further including a hydraulic cylinder coupled between the movable track-engaging member and the electric drive assembly. A manually-accessible hydraulic port permits hydraulic fluid exchange with the hydraulic cylinder to manually position of the movable track-engaging member.

13. The active track-chain sag management system of example 1, further including a hydraulic cylinder coupled between the movable track-engaging member and the electric drive assembly. A pressure relief valve is fluidly coupled to the hydraulic cylinder and configured to open to allow outflow of hydraulic fluid when an internal pressure within the hydraulic cylinder exceeds a predetermined threshold.

14. The active track-chain sag management system of example 1, wherein the controller is further configured to command the electric drive assembly to adjust the track-chain sag of the track-chain in response to detecting that the crawler vehicle has transitioned between traveling in forward and reverse directions.

15. In further embodiments, the active track-chain sag management system includes an electric motor having a motor output shaft, a planetary screw drive, and an idler wheel. The planetary screw drive includes, in turn a threaded spindle coupled to the motor output shaft for rotation about a central axis, and a translating nut configured to translate along the central axis in response to rotation of the threaded spindle. The idler wheel is coupled to the translating nut and configured to move therewith along the central axis. The idler wheel engages into a track-chain of the tracked undercarriage to increase track-chain tension and decrease track-chain sag of the track-chain as the idler wheel advances along the central axis in a direction opposite the electric motor.

CONCLUSION

Embodiments of an active track-chain sag management system have thus been disclosed, which automatically adjust track-chain tension and sag utilizing electrically-driven track-chain tensioning devices integrated into the crawler vehicle undercarriages. Embodiments of the track-chain sag management system greatly reduce operator maintenance requirements, while optimizing current track-chain tension settings for current operating conditions to reduce component wear, maximize undercarriage lifespan, and provide operative performance benefits, such as improved fuel economy. Further, in at least some embodiments, the active track-chain sag management system may independently or automatically determine and implement appropriate adjustments in track-chain tensioning and track-chain sag without reliance on operator involvement. Operative cost savings and customer satisfaction levels may be improved as a result. Other benefits are also achieved by embodiments of the active track-chain sag management system. For example, in various implementations, the track-chain sag management system includes a linear electric drive assembly including a planetary gear drive (e.g., a planetary screw drive) enabling the application of high axial output forces urging linear movement of an idler wheel into the track-chain, while utilizing a low voltage, low torque output motor well-suited for deployment within the electrically-grounded, contaminant-ridden, harsh operative environment of the crawler vehicle undercarriage.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An active track-chain sag management system utilized in conjunction with a crawler vehicle having a tracked undercarriage, the active track-chain sag management system comprising:
a movable track-engaging member positioned for physical engagement into a track-chain of the tracked undercarriage;
an electric drive assembly controllable to adjust a track-tensioning position of the movable track-engaging member relative to the track-chain; and
a controller operatively coupled to the electric drive assembly, the controller configured to command the electric drive assembly to repeatedly adjust the track-chain sag of the track-chain by varying the track-tensioning position of the movable track-engaging member during operation of the tracked undercarriage;
wherein the movable track-engaging member comprises an idler wheel; and
wherein the electric drive assembly comprises a linear electric drive assembly configured to move the idler wheel into engagement with the track-chain along a substantially linear axis.

2. The active track-chain sag management system of claim 1, wherein the controller is further configured to:
establish a target track-chain tension ($T_{TARGET}$) corresponding to a desired track-chain sag of the tracked undercarriage;
repeatedly estimate a current track-chain tension ($T_{CURRENT}$) of the track-chain during operation of the tracked undercarriage; and
command the linear electric drive assembly to adjust the track-tensioning position of the movable track-engaging member to reduce disparities between the target track-chain tension ($T_{TARGET}$) and the current track-chain tension ($T_{CURRENT}$).

3. The active track-chain sag management system of claim 2, wherein the linear electric drive assembly comprises an electric motor; and
wherein the controller is coupled to the electric motor and is configured to estimate the current track-chain tension ($T_{CURRENT}$) of the track-chain based, at least in part, on a current torque output of the electric motor.

4. The active track-chain sag management system of claim 2, further comprising an operator interface to which the controller is operably coupled;
wherein the controller is configured to establish the target track-chain tension ($T_{TARGET}$) based, at least in part, on operator input received via the operator interface.

5. The active track-chain sag management system of claim 2, further comprising a data source providing data indicative of current ground conditions;
wherein the controller is configured to establish the target track-chain tension ($T_{TARGET}$) based, at least in part, on data indicative of current ground conditions.

6. The active track-chain sag management system of claim 1, wherein the linear electric drive assembly comprises:
an electric motor having a motor output shaft; and
at least one device configured to convert rotation of the motor output shaft to substantially linear movement of the idler wheel and to amplify an axial force at which the idler wheel is engaged into the track relative to a torque output of the motor output shaft.

7. The active track-chain sag management system of claim 6, wherein the at least one device comprises a planetary screw drive.

8. The active track-chain sag management system of claim 7, wherein the planetary screw drive comprises a translating nut;
wherein the active track-chain sag management system further comprises a locking mechanism configured to prevent translational movement of the translating nut when the locking mechanism is engaged;
wherein the controller is operably coupled to the locking mechanism and configured to engage the locking mechanism after commanding the electric drive assembly to adjust the track-tensioning position of the movable track-engaging member.

9. The active track-chain sag management system of claim 1, wherein the controller is further configured to command the linear electric drive assembly to adjust the track-chain sag of the track-chain in response to detecting that the crawler vehicle has transitioned between traveling in forward and reverse directions.

10. The active track-chain sag management system of claim 1, wherein the linear electric drive assembly comprises an electric motor having a torque output between about 20 to about 200 Newton-meters; and
wherein the linear electric drive assembly is configured to engage the idler wheel into the track-chain at an axial force ranging between 50 and 200 kilonewtons.

11. An active track-chain sag management system utilized in conjunction with a crawler vehicle having a tracked undercarriage, the active track-chain sag management system comprising:
a movable track-engaging member positioned for physical engagement into a track-chain of the tracked undercarriage;
an electric drive assembly controllable to adjust a track-tensioning position of the movable track-engaging member relative to the track-chain; and
a controller operatively coupled to the electric drive assembly, the controller configured to:
command the electric drive assembly to repeatedly adjust the track-chain sag of the track-chain by varying the track-tensioning position of the movable track-engaging member during operation of the tracked undercarriage;
establish a target track-chain tension ($T_{TARGET}$) corresponding to a desired track-chain sag of the tracked undercarriage;
repeatedly estimate a current track-chain tension ($T_{CURRENT}$) of the track-chain during operation of the tracked undercarriage;
command the electric drive assembly to adjust the track-tensioning position of the movable track-engaging member to reduce disparities between the target track-chain tension ($T_{TARGET}$) and the current track-chain tension ($T_{CURRENT}$);
determine when the tracked undercarriage engages in continuous travel for a predetermined time period; and
estimate the current track-chain tension ($T_{CURRENT}$) of the track-chain in response to determining that the tracked undercarriage has engaged in continuous travel for the predetermined time period.

12. An active track-chain sag management system utilized in conjunction with a crawler vehicle having a tracked undercarriage, the active track-chain sag management system comprising:
a movable track-engaging member positioned for physical engagement into a track-chain of the tracked undercarriage;
an electric drive assembly controllable to adjust a track-tensioning position of the movable track-engaging member relative to the track-chain;
a hydraulic cylinder coupled between the movable track-engaging member and the electric drive assembly;
a hydraulic port permitting hydraulic fluid exchange with the hydraulic cylinder to manually position the movable track-engaging member; and
a controller operatively coupled to the electric drive assembly, the controller configured to command the electric drive assembly to repeatedly adjust the track-chain sag of the track-chain by varying the track-tensioning position of the movable track-engaging member during operation of the tracked undercarriage.

13. An active track-chain sag management system utilized in conjunction with a crawler vehicle having a tracked undercarriage, the active track-chain sag management system comprising:
a movable track-engaging member positioned for physical engagement into a track-chain of the tracked undercarriage;
an electric drive assembly controllable to adjust a track-tensioning position of the movable track-engaging member relative to the track-chain;
a hydraulic cylinder coupled between the movable track-engaging member and the electric drive assembly;
a pressure relief valve fluidly coupled to the hydraulic cylinder and configured to open to allow outflow of hydraulic fluid when an internal pressure within the hydraulic cylinder exceeds a predetermined threshold; and
a controller operatively coupled to the electric drive assembly, the controller configured to command the electric drive assembly to repeatedly adjust the track-chain sag of the track-chain by varying the track-tensioning position of the movable track-engaging member during operation of the tracked undercarriage.

14. An active track-chain sag management system utilized in conjunction with a crawler vehicle having a tracked undercarriage, the active track-chain sag management system comprising:
a linear electric drive assembly comprising an electric motor having a motor output shaft; and
a planetary screw drive, comprising:
a threaded spindle coupled to the motor output shaft for rotation about a central axis; and
a translating nut configured to translate along the central axis in response to rotation of the threaded spindle; and
an idler wheel coupled to the translating nut and configured to move therewith along the central axis, the idler wheel engaging into a track-chain of the tracked undercarriage to increase track-chain tension and decrease track-chain sag of the track-chain as the idler wheel is advanced along the central axis in a direction opposite the electric motor; and
a controller operatively coupled to the electric motor and configured to command the electric motor to repeatedly adjust the track-chain sag of the track-chain by moving the idler wheel during operation of the tracked undercarriage.

15. The active track-chain sag management system of claim 14, further comprising:
a locking mechanism that, when engaged, deters movement of the translating nut;
wherein the controller is operably coupled to the locking mechanism and configured to selectively: (i) disengage the locking mechanism, (ii) command the electric motor to adjust the position the idler wheel to adjust the track-chain sag of the track-chain, and (iii) re-engage the locking mechanism after positioning the idler wheel to adjust the track-chain sag of the track-chain.

16. The active track-chain sag management system of claim 14, further comprising:
a hydraulic cylinder mechanically coupled in series with the planetary screw drive, the electric motor, and the idler wheel;
a hydraulic fluid port fluidly coupled to the hydraulic cylinder and permitting manual adjustment of a hydraulic fluid volume within the hydraulic cylinder; and
a pressure relief valve further fluidly coupled to the hydraulic cylinder and configured to open when an internal pressure within the hydraulic cylinder exceeds a predetermined threshold value.

17. An active track-chain sag management system utilized in conjunction with a crawler vehicle having a tracked undercarriage, the active track-chain sag management system comprising:
a movable track-engaging member positioned for physical engagement into a track-chain of the tracked undercarriage;
an electric drive assembly including an electric motor controllable to adjust a track-tensioning position of the movable track-engaging member relative to the track-chain;
a controller operatively coupled to the electric motor, the controller configured to:
establish a target track-chain tension ($T_{TARGET}$) corresponding to a desired track-chain sag of the tracked undercarriage;
estimate a current track-chain tension ($T_{CURRENT}$) of the track-chain during operation of the tracked undercarriage based, at least in part, on a current torque output of the electric motor;
generate an alert when a difference between the target track-chain tension ($T_{TARGET}$) and the current track-chain tension ($T_{CURRENT}$) exceeds a predetermined threshold value;
determine when the tracked undercarriage engages in continuous travel for a predetermined time period; and
estimate the current track-chain tension ($T_{CURRENT}$) of the track-chain in response to determining that the tracked undercarriage has engaged in continuous travel for the predetermined time period.

18. The active track-chain sag management system of claim 6, further comprising a display device coupled to the controller and on which the controller generates an advisory alert to check the track-chain sag of the tracked undercarriage if the difference between the target track-chain tension ($T_{TARGET}$) and the current track-chain tension ($T_{CURRENT}$) exceeds the predetermined threshold value.

19. The active-track chain sag management system of claim 17, wherein the controller is further configured to command the electric motor to adjust the track-tensioning position of the movable track-engaging member to reduce disparities between the target track-chain tension ($T_{TARGET}$) and the current track-chain tension ($T_{CURRENT}$).

\* \* \* \* \*